(12) United States Patent
Hägele et al.

(10) Patent No.: US 10,371,180 B2
(45) Date of Patent: Aug. 6, 2019

(54) HYDRAULIC ADJUSTING DEVICE

(71) Applicant: HÄGELE GMBH, Schorndorf (DE)

(72) Inventors: Karl Hägele, Schorndorf (DE); Markus Lechler, Schorndorf (DE)

(73) Assignee: HÄGELE GMBH, Schorndorf (DE)

( * ) Notice: Subject to any disclaimer, the term of this patent is extended or adjusted under 35 U.S.C. 154(b) by 630 days.

(21) Appl. No.: 14/900,523

(22) PCT Filed: Aug. 25, 2014

(86) PCT No.: PCT/EP2014/002315
§ 371 (c)(1),
(2) Date: Dec. 21, 2015

(87) PCT Pub. No.: WO2015/028136
PCT Pub. Date: Mar. 5, 2015

(65) Prior Publication Data
US 2016/0153479 A1    Jun. 2, 2016

(30) Foreign Application Priority Data
Aug. 26, 2013 (DE) ................. 10 2013 014 033

(51) Int. Cl.
*F01D 7/00* (2006.01)
*F15B 15/14* (2006.01)
(Continued)

(52) U.S. Cl.
CPC .......... *F15B 15/1452* (2013.01); *B63H 3/00* (2013.01); *B64C 11/30* (2013.01); *B64C 11/385* (2013.01);
(Continued)

(58) Field of Classification Search
CPC .......... F15B 15/1452; F15B 15/149; F15B 15/1466; F16H 63/16; F04D 15/0055;
(Continued)

(56) References Cited

U.S. PATENT DOCUMENTS

| | | | | |
|---|---|---|---|---|
| 3,240,275 A | * | 3/1966 | Bennett | B64C 11/40 416/157 R |
| 3,293,994 A | * | 12/1966 | Napolitano | F04B 53/126 92/165 R |
| 3,746,466 A | * | 7/1973 | Dallach | B63H 3/082 416/153 |
| 3,873,235 A | * | 3/1975 | Mendelson | F01D 7/00 416/154 |

(Continued)

FOREIGN PATENT DOCUMENTS

| | | |
|---|---|---|
| DE | 198 39 142 | 4/1999 |
| JP | 56-86210 | 3/2015 |
| WO | 2011/072381 | 6/2011 |

OTHER PUBLICATIONS

International Preliminary Report on Patentability issued by the International Bureau of WIPO Office for International Patent Application No. PCT/EP2014/002315, dated Mar. 10, 2016, 20 pages.

(Continued)

*Primary Examiner* — Dwayne J White
*Assistant Examiner* — Adam W Brown
(74) *Attorney, Agent, or Firm* — Faegre Baker Daniels LLP

(57) ABSTRACT

The invention concerns a hydraulic adjusting device (1, 35) having at least two leakage paths (24, 25) which are connected by a transition channel (27), a sealing arrangement (18) which leads back to a working chamber (10) being provided in one of the leakage paths (24, 25) in delimiting manner relative to the working chamber (10) of the adjusting device (35).

12 Claims, 2 Drawing Sheets

(51) Int. Cl.
  *F03D 7/02* (2006.01)
  *F04D 29/00* (2006.01)
  *B63H 3/00* (2006.01)
  *B64C 11/30* (2006.01)
  *F04D 15/00* (2006.01)
  *B64C 11/40* (2006.01)
  *B64C 11/42* (2006.01)
  *B64C 11/38* (2006.01)
  *F16H 63/16* (2006.01)

(52) U.S. Cl.
  CPC .............. *B64C 11/40* (2013.01); *B64C 11/42* (2013.01); *F01D 7/00* (2013.01); *F03D 7/022* (2013.01); *F03D 7/0224* (2013.01); *F04D 15/0055* (2013.01); *F04D 29/00* (2013.01); *F15B 15/149* (2013.01); *F15B 15/1466* (2013.01); *F16H 63/16* (2013.01)

(58) Field of Classification Search
  CPC ........... F04D 29/00; B63H 3/00; B64C 11/30; B64C 11/38; B64C 11/385; B64C 11/40; B64C 11/42; F01D 7/00; F03D 7/022; F03D 7/0224
  See application file for complete search history.

(56) References Cited

U.S. PATENT DOCUMENTS

| | | | | |
|---|---|---|---|---|
| 4,597,322 | A | * | 7/1986 | Garnjost ............. F15B 15/1433 |
| | | | | 92/166 |
| 4,678,402 | A | * | 7/1987 | Roe ........................ B64C 11/42 |
| | | | | 416/154 |
| 6,129,003 | A | | 10/2000 | Udagawa |
| 6,463,841 | B2 | * | 10/2002 | Niwa ........................ B66F 9/22 |
| | | | | 91/408 |
| 9,803,657 | B2 | * | 10/2017 | Froehlich .............. F15B 11/072 |
| 2009/0196747 | A1 | | 8/2009 | McCallum et al. |

OTHER PUBLICATIONS

International Search Report dated Nov. 12, 2014 in PCT/EP2014/002315.
Written Opinion, dated Mar. 5, 2015 in PCT/EP2014/002315.
Office Action dated May 17, 2017 in corresponding Canadian Patent Application No. 2,917,375, 3 pages.
Response to Office Action dated May 17, 2017 in corresponding Canadian Patent Application No. 2,917,375, filed Oct. 19, 2017, 3 pages.

* cited by examiner

HYDRAULIC ADJUSTING DEVICE

CROSS-REFERENCE TO RELATED APPLICATION

The present application is a National Stage of International Application No. PCT/EP2014/002315, filed Aug. 25, 2014, which claims priority to DE 10 2013 014 033.1, filed Aug. 26, 2013, the entire disclosures of which are hereby expressly incorporated herein by reference.

BACKGROUND/SUMMARY

The invention relates to a hydraulic adjusting device according to the preamble of claim 1.

Such a hydraulic adjusting device, in the form of a hydraulic adjusting cylinder with a closed working chamber, is known from U.S. Pat. No. 3,293,994 A, isolated by a cylinder wall on the circumference thereof, and stationary end walls position in relation to the cylinder wall, as delimiting elements. An adjustment piston that can be displaced axially is received in the working chamber. The piston rod of the adjustment piston passes through one of the end walls, into the working chamber in a sealed manner. This end wall is disposed in a fixed position in relation to the cylinder wall, sealed via a pair of seals having an annular space located axially between the seals.

The end wall through which the piston rod passes encloses an annular space surrounding the piston rod, in which a cylindrical piston is located. This cylindrical piston is sealed off to the piston rod and to the end wall in each case, and is disposed such that it can be displaced axially, with a limitation to the distance thereof. This delimitation in relation to the end wall is obtained by axially spaced apart delimit stops provided on the end surface and lying at the end of the cylindrical piston. The cylindrical piston is supported via a spring assembly in the direction toward the stop delimiting the adjustment path of the cylindrical piston in the extension direction of the piston rod. This spring assembly lies in an annular space, encompassing the piston rod, which annular space has a variable volume that can be modified by the axial adjustment of the cylindrical piston, which annular space is delimited axially by the cylindrical piston and an end surface of the end wall through which the piston rod passes. This variable volume, radial inner annular space and the radial outer annular space lying between the seals form, in each case, a leakage accumulation chamber and are connected via transition channels that pass radially through the end wall.

The piston rod is provided with a stop in its actuation-side end region extending axially over the cylindrical piston, which in the retraction direction of the piston rod delimits its adjustment path in relation to the cylindrical piston, and when the piston rod is retracted, conveys the cylindrical piston against the adjustment force of the spring assembly toward the end surface of the end wall through which it passes.

The leakage accumulation chambers are connected to the working chamber via a spring loaded blocking valve assembly on a return channel that acts against the return direction toward the working chamber. The leakage that, regardless of the seals, on one hand between the end wall through which the piston rod passes and the cylinder wall, and on the other hand, between this end wall and the piston rod, manages to pass into the leakage accumulation chamber, is pumped back toward the working chamber by means of the cylindrical piston conveyed by the retracting piston rod, such that only one leakage path remains, formed by the displaceable, sealed guide, between the cylindrical piston and the piston rod.

In addition to such complex adjusting devices, simple adjusting devices, formed by a hydraulic adjustment cylinder having a sealed piston disposed in the cylinder that can be displaced longitudinally, with which the respective adjusting forces applied by the hydraulic compression of the piston are transferred outward via a piston rod, which is sealed in relation to the cylinder via a cylinder-side sealing assembly. For the most part, simple rod seals are used thereby for the sealing assembly. The use of more complex tandem seals is also known, which are designed to prevent leakage to the greatest possible extent, are also designed as recirculating seals to the working chamber.

Aside from the fact that such recirculating tandem sealing arrangements require a function-conditional axial movement between the elements delimiting the sealing gap as a leakage path for the recirculation effect that is strived for, such as that between the piston rod and cylinder, there are leakage paths that are not only between parts that are moved axially against one another, but also between rotating parts or parts that are connected to one another in a stationary manner. This may result, in particular with regard to environmental conditions that are critical to leakage, in the suppression of such leakages, or even the prevention of such leakages to the greatest possible extent, through appropriate measures with regard to their negative effects, even when these leakages are of an insignificant nature.

The invention addresses the object of presenting a structurally simple possibility, with respect to more complex adjusting devices, of the type outlined in the preamble of claim 1, in order to also eliminate leakages running over unavoidable leakage paths, without having a negative effect on the functioning of the adjusting device.

In accordance with the invention, a sealing assembly having a recirculating effect is disposed in hydraulic adjusting devices for this purpose, having moving parts sealed against one another along an axial guidance path, as delimiting elements to a working chamber in the guidance path forming a leakage path, and the recirculation effect of this sealing assembly is used in order to also recirculate leakages occurring in another manner in the device through the connection of the respective leakage paths, or from leakage accumulation chambers provided for these leakage paths, with the recirculating sealing assembly in the hydraulic circuit of the adjustment device.

The merging of such leakages toward the recirculating sealing assembly occurs via one or more transition channels, which, along with the recirculating sealing assembly, the leakage paths and leakage accumulation chambers are provided with a delimiting element assigned thereto, in the form of an integral, or installed component of the device. In particular, such a design is advantageous when, with a rotatable assembly of the adjusting device, this delimiting element is also assigned to the supply input necessary for supplying the working chamber.

With the adjusting device according to the invention, a pot-shaped cylindrical piston and a bowl-body having a central dome, covered by the cylindrical piston, are provided as the delimiting elements, such that the working chamber is formed axially between the pot-floor of the cylindrical piston and the central dome of the bowl-body. Such assemblies are particularly suited for adjusting devices that can be used in different manners with an unchanging fundamental construction.

The merging of the occurring leakages for a collective recirculation toward the working chamber, and thus toward the hydraulic circuit, via a recirculating sealing assembly, has proven to be functional, in particular when the conveyance of the leakage to the recirculating sealing assembly is supported by centrifugal force, or occurs, alternatively, via a gradient. This is also the case when such sealing assemblies, by means of which a supplementary suction effect is obtained, are used as the recirculating sealing assembly.

Sealing assemblies used in the framework of the invention having seals that are axially spaced apart from one another in the leakage path are, in particular, so-called tandem seals, wherein the axial space lying between the spaced apart seals serves as a leakage accumulation chamber, into which the transition channel(s) open(s).

The invention has proven to be particularly advantageous in conjunction with hydraulic, axial adjusting devices, in which a working chamber is delimited in terms of its volume change capacity via axially displaceable delimiting elements, and the delimiting elements, together with the working chamber form a rotational unit that is coaxial in relation to the displacement direction of the delimiting elements, to which the supply input for the working chamber is disposed in a rotational and sealed manner, such that the supply input can be fixed in position, thus disposed in a stationary manner, and as a result, stationary connections or line connections can also be provided in the hydraulic feed at the supply input.

This is the case, by way of example, with adjusting devices integrated in the hub of a fan wheel having radial fan blades supported in the hub on its circumference, which can be adjusted in terms of their angle of incidence via the adjusting device functioning as an actuator. The hub can be axially and non-rotatably connected to a central rotary drive thereby, thus, by way of example, to the crankshaft of an internal combustion engine, or used as an axial actuator for a transmission having gear elements that are to be adjusted axially in relation to one another, thus, in particular, for a variable speed drive having tapered rollers that are to be adjusted axially in relation to one another in terms of their spacing, or conical belt pulleys that are to be adjusted axially in relation to one another, as is the case, for example, with CVT gearings. When used in this manner, it is beneficial if the adjusting device is supported in a rotational and axially stationary manner in relation to a supporting structure via its bowl body, such that the axially adjustable cylindrical piston acts on the respective part that is to be axially adjusted.

Thus, a hydraulic adjusting device having a working chamber with a changing volume capacity is obtained with the invention, in which at least two leakage paths are collectively assigned to a delimiting element of the working chamber, and are at least partially delimited by this delimiting element, and in which a sealing assembly is provided in a leakage path running along an axial guidance path for this delimiting element, which is connected to the other leakage path via a transition channel running in the delimiting element, and which is designed as a recirculating sealing assembly on the working chamber.

BRIEF DESCRIPTION OF THE DRAWINGS

Further details and features of the invention can be derived from the Claims and description, in which the adjusting device according to the invention is explained below, in principle, in terms of its structural construction, wherein FIG. 1 shows the fundamental construction of an adjusting device, as it is to be used, for example, in conjunction with a fan wheel, the hub of which accommodates the adjusting device, by means of which, fan blades disposed radially about the hub of the fan wheel can be adjusted in terms of their angle of incidence, and wherein

DETAILED DESCRIPTION

Figure 1:
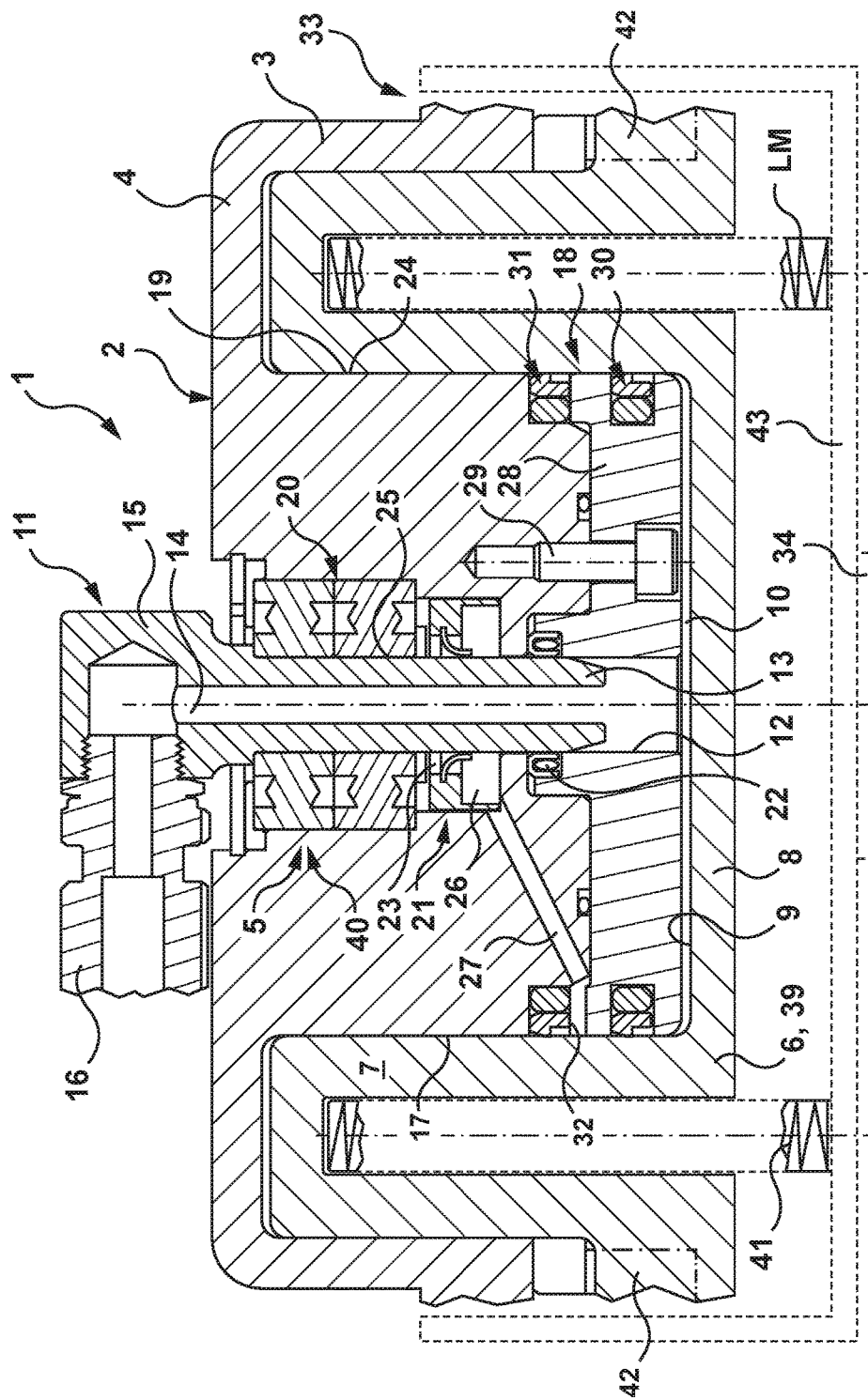

The adjusting device 1 illustrated in the Figures in its fundamental construction has a bowl body 2, having a dome 5 located centrally in relation to its annular bowl wall 3, extending upward from the bowl floor 4. A pot-shaped cylindrical piston 6 is provided concentrically and axially opposite the bowl body 2, the pot wall of which is indicated by the numeral 7, and the pot floor of which is indicated by the numeral 8. The pot floor 8 lies axially opposite the end wall 9 of the dome 5. There is a working chamber 10 between the pot floor 8 and the end wall 9, which can be subjected to hydraulic pressure, and, as a function of the hydraulic pressure applied thereto, the cylindrical piston 6 can be axially displaced in relation to the bowl body 2, wherein the cylindrical piston 6, as shown in FIG. 1, is spring loaded at its position when retracted against the dome 5. A corresponding spring support can be implemented, by way of example, with a number of helical springs 41.

The application of hydraulic pressure to the working chamber 10 occurs via a supply input 11, which is disposed in a central axial bore hole 12 of the dome 5, and which opens into the working chamber 10. The supply input 11 has a neck 13 through which an axial supply bore hole 14 passes, which transitions into a connecting piece 15 that extends above the bowl floor 4, by means of which, as shown, a connecting line 16 is connected to the supply input 11, preferably substantially parallel to the bowl floor 4.

The pot-shaped cylindrical piston 6, with the pot floor 8 and the pot wall 7 that intersects therewith, forms the delimiting element 39 to the working chamber 10, and the dome 5, with its end wall 9 and the circumferential wall 17 intersecting this, forms the delimiting element 40. A sealing assembly 18 is assigned to the delimiting elements 39, 40 in the axial proximity to the working chamber 10, which seals the guidance path 19, formed by the circumferential wall 17 on one hand, and the pot wall 7 on the other hand, against the working chamber 10. A possible (first) leakage path 24 is obtained along the guidance path 19, depending on the sealing effect of the sealing assembly 18.

The neck 13 of the supply input 11 is also sealed against the axial bore hole 12, wherein here, with respect to the rotational support of the supply input 11 against the bowl body 2 via a bearing assembly 20 in the axial transition between this bearing assembly 20 and the extension of the neck 13 toward the working chamber 10, a sealing device 21 is provided, formed by two axially spaced apart sealing elements 22, 23. Depending on the effectiveness of the sealing assembly 21, there is also a risk of leakages between the axial bore hole 12 and the neck 13 of the supply input 11 accommodated therein as limits to a (second) leakage path 25, which opens into the environment opposite the working chamber 10.

A leakage accumulation chamber 26 is formed between the axially spaced apart sealing elements 22 and 23 of the sealing device 21, which is connected to the sealing assembly 18 via at least one transition channel 27, which is designed as a recirculating sealing assembly 18 for the working chamber 10, such that potential leakage quantities from the leakage accumulation chamber 26 are supplied to the recirculating sealing assembly 18, this being due to a suction effect of this sealing assembly 18, and/or, with a substantially radial course of the transition channel 27, by means of resulting centrifugal forces, caused by rotating the bowl body 2 together with the cylindrical piston 6, which function as the rotational unit encompassing the working chamber 10.

The dome 5 is designed axially as an assembled unit, as is shown schematically in the drawing, in which the dome 5 is formed by an end plate 28, adjacent to the working chamber 10, which is connected, for example, by means of an indicated screw attachment 29, to the dome portion extending upward from the bowl floor 4. The assembled design of the dome 5 is advantageous with respect to the introduction of the transition channel 27, and facilitates the distribution of the sealing elements 22, 23 belonging to the sealing device 21 and the sealing assembly 18 formed by layered seals 30, 31 on the two dome parts, which is beneficial for functional reasons, and constructively, the arrangement thereof is facilitated, as well as the installation thereof.

Recirculating sealing assemblies 18 can be realized with different known sealing designs, thus, among others, with known rectangular or layered seals, in particular PTFE rectangular or layered seals, with an O-ring backing. A preferred design for such recirculating sealing assemblies 18, used in the framework of the application according to the invention, is the design shown in the exemplary embodiments as a so-called tandem seal.

This has two layered seals 30 and 31 disposed in annular grooves of the dome 5, spaced apart axially, between which an intermediate sealing space remains as a leakage accumulation chamber 32, and which are disposed in the same orientation. For this, the two layered seals 30 and 31 each have a radially outer composite seal, which is radially supported toward the inside in an elastic manner via an O-ring, and axially toward the inside, i.e. toward the working chamber 10, is pulled back, radially outward, in a layer, such that the sealing edge of the composite seal lies in its axially central region. Starting from the sealing edge, which can also be designed to be handled, the composite seal runs on its circumference axially outward, preferably slightly conically, and tilted radially inward. Such layered seals are available in the market in different forms, and are offered, by way of example, as so-called "Stepseal® seals" from the company Trelleborg.

The advantage of such a sealing assembly 18 is that the axially outer seal—here the layered seal 31—intercepts the dynamic leakage of the axially inner seal—here the layered seal 30—such that a certain storage results in the intermediate space here the leakage accumulation chamber 32—by means of which leakage quantities, fluctuating in relation to changing operating conditions, can be intercepted in a compensating manner, such that, when seen over the course of longer operating times, it is possible to configure the axially inner seal (layered seal 30) for an average recirculation capacity, i.e. a return pumping quantity. Fundamentally, it is also possible to provide a merely blocking seal, or even only a wiper, instead of a recirculating, axially outer seal (layered seal 31), wherein, for sealing parts that are subjected to friction, PTFE may be used as the material.

FIG. 1 illustrates, with a broken line, the integration of the adjusting device 1 in the hub 33 of a fan wheel having radial fan blades, which can be adjusted in terms of their angle of incidence via the adjusting device 1. A construction in this regard can be seen, in particular, in FIGS. 2 to 4 of DE 10 2004 035 631 A1. Applied to the adjusting device 1 according to FIG. 1, it can be seen that the cylindrical piston 6, in its radially outer circumferential region, schematically indicated in FIG. 1 by the dash/dot line 42, supports gear racks extending in its direction of adjustment, thus axially, in which a pinion, disposed on the radial inner end of the respective fan blade, supported in the hub 33, engages. It is furthermore indicated in FIG. 1 that the hub 33, which is formed, in part, by the bowl body 2, and which furthermore has an axially opposing housing part 43 supplementing it, is provided with an attachment flange 34 that is axially opposite the supply input 11, by means of which flange the fan wheel is connected to a respective rotary drive, which may be formed, for example, by the crank shaft of an internal combustion engine.

Figure 2:
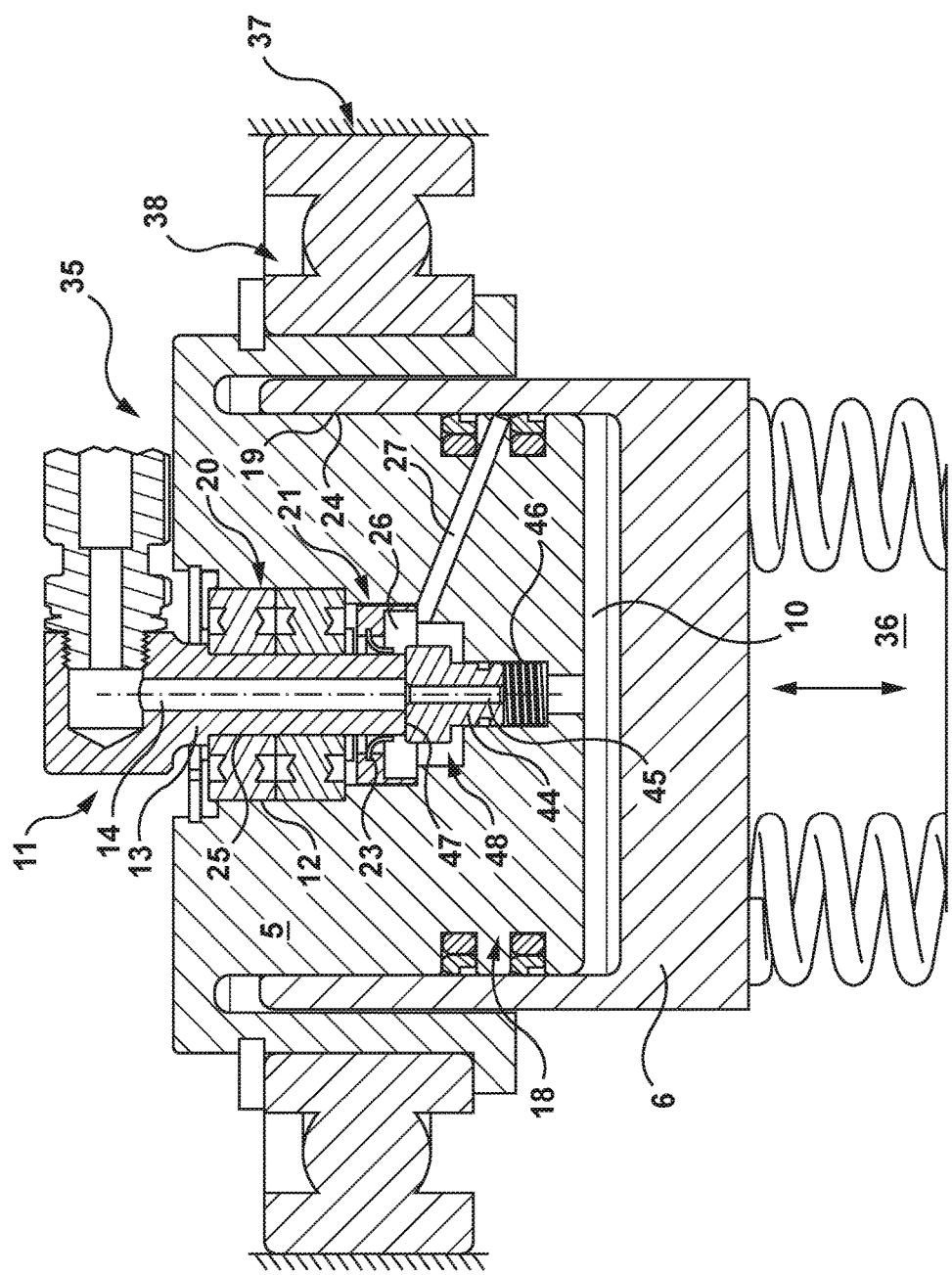
FIG. 2 shows, in relation to an adjusting device, which corresponds to the one according to FIG. 1 in terms of its fundamental construction, the variation thereof being shown with respect to a use as an axial actuator, which is to be used for the axial adjustment of one of the conical belt pulleys of a step-less belt transmission, or the tapered rollers of a tapered roller transmission in their spacing to one another.

While FIG. 1 illustrates the use of the adjusting device 1 integrated in the hub 33 of a fan wheel, FIG. 2 shows an application for an adjusting device 35, having in principle, the same structural design, in which the adjusting device 35 acts directly on a working unit 36 that is to be adjusted axially via the cylindrical piston 6. By way of example, and preferably, a known belt pulley drive, or a tapered roller drive, is provided as such a working unit 36, of which belt pulleys or tapered rollers that are to be adjusted axially in relation to one another in terms of their spacing in order to modify the transmission ration, one is to be acted on, in particular directly, via the cylindrical piston 6. Accordingly, the adjusting device 35 forms a unit that rotates together with the respective belt pulleys or tapered rollers with such a design, which is carried along via the belt pulley or tapered roller, if applicable, or, as is illustrated in the depiction in accordance with FIG. 2, is also supported as a carrier for the belt pulley or tapered roller, rotatable for its part in relation to a supporting structure, not depicted herein, indicated with the numeral 37. This support of the supporting structure 37 is illustrated by a bearing 38, which is attached, for its part, on the outside of the bowl wall 3 of the bowl body 2. The construction of the adjusting device 35, as has already been stated, corresponds otherwise substantially to that construction for the depiction in accordance with FIG. 1, which has already been explained in detail, for which reason, the same reference symbols are used in FIGS. 1 and 2, with respect to the respective adjusting devices 1 and 35.

In differing from the design according to FIG. 1, in the design according to FIG. 2 the neck 13 of the supply input 11 is supported in a sealing manner at the end surface, in particular via a mechanical shaft seal in the region of the leakage accumulation chamber 26 of the sealing device 21 against a transition piece 44 supported in a non-rotatable, sealing and axially resilient manner in the axial bore hole 12, which has a through hole 45 that runs to the working chamber 10, in the extension of the supply bore hole 14. By means of the sealing and non-rotating arrangement of the transition piece 44, with the design according to FIG. 2, functionally corresponding to the sealing element 22 of the sealing device 21 according to FIG. 1, a sealing element 48 is formed that delimits the leakage accumulation chamber 28 against the working chamber 10. With a transition piece 44 bearing axially against the end surface of the neck 13 via a spring 46, the bearing surface lies as a sealing surface between the sealing elements 22 and 48 and the transition piece 44 can rotate with the dome 5 in relation to the supply input 11.

The application explained in conjunction with the depiction according to FIG. 2 makes it clear that the solution according to the invention for adjusting devices 1, or 35, respectively, enables a very compact construction, with which, even with smaller sizes, greater adjustment forces can be implemented, without there being a concern regarding impurities caused by leakages in this adjusting device 1. In particular, by means of the design according to the invention, regardless of the direction of rotation for the hydraulic working fluid via the supply input 11, a leakage-tight assembly is ensured with conventional sealing means with respect to the rotation, because—as is shown in FIG. 1—a leakage quantity somewhat over the inner sealing element 22, designed as a radial seal, of the sealing device 21, that has not been intercepted, ends up in the leakage accumulation chamber 26 bordering it at the outside via the sealing element 23—designed here as a wiper—from which leakages are conveyed via the transition channel 27 to the accumulation chamber 32 of the sealing assembly 18, and via this sealing assembly, due to its pump effect, are fed back into the hydraulic system.

A corresponding functionality is also achieved with the design for the sealing device according to FIG. 2, wherein, instead of the radial seal between the neck 13 and the axial bore hole 12 that accommodates this in a rotating manner, in accordance with FIG. 1, with a transition piece 44 that is non-rotatable in relation to the axial bore hole 12, an end surface seal 47, in particular in the form of a slide ring seal, is provided between the extension end of the neck 13 and the axially opposite end surface of the transition piece 44 inserted in the axial bore hole 12. As a result, a design is also created for the sealing device 21, in which the diameter of the sealing limit is independent of the diameter of the neck 13, and can be implemented with very small diameters.

The invention shows, in particular, for adjusting devices 1, 35, how a practically leakage-free operation is obtained for these, notwithstanding, at least two possible leakage paths—specifically that leakage path 24 running along the guidance path 19 and that leakage path 25 running along the neck 13 of the supply input 11 in the axial bore hole 12—using simple and technically readily understood means, which expands the application range for hydraulic adjusting devices to application fields in which fogging with hydraulic fluid caused by leakages would prevent a use, not only for visual reasons, but also for functional reasons.

Thus, a hydraulic adjusting device 1, 35 having at least two leakage paths 24, 25 is created by the invention, which paths are connected by means of a transition channel 27, wherein, in one of the leakage paths 24, 25, bordering on a working chamber 10 of the adjusting device 1, 35, a recirculating sealing assembly 18 is provided that recirculates fluid to the working chamber 10.

What is claimed is:

1. A hydraulic adjusting device having a hydraulic circuit, a working chamber connected to the hydraulic circuit, the volume capacity of which can be modified by at least a pair of delimiting elements, and at least two leakage paths, of which a first leakage path runs between the delimiting elements to the working chamber and via a sealing assembly comprising a plurality of seals, the sealing assembly lying in the first leakage path, having a leakage accumulation chamber connected to the first leakage path and lies between the seals, having a transition channel connecting the two leakage paths, connected to the first leakage path via the leakage accumulation chamber lying between the seals, as well as having a conveyance device that recirculates the leakage back to the working chamber, wherein the delimiting elements can be displaced axially against one another, and are formed by a bowl body having a central dome, and a pot-shaped cylindrical piston that encompasses said bowl body, wherein the working chamber, having a modifiable volume capacity, lies axially between the central dome and the pot-shaped cylindrical piston encompassing said dome, and wherein the sealing assembly lying in the first leakage path forms the conveyance device that, dependent on the direction of the displacement of the delimiting elements acting against one another, recirculates the fluid back to the working chamber.

2. The hydraulic adjusting device according to claim 1, wherein, of the leakage paths, a second leakage path connected to the working chamber runs between the bowl body accommodating the transition channel and a guide for an supply input opening into the working chamber formed in the bowl body.

3. The hydraulic adjusting device according to claim 2, wherein the supply input is rotatably disposed for accommodating the bowl body.

4. The hydraulic adjusting device according to claim 1, wherein the bowl body and the cylindrical piston form, together with the working chamber accommodated therein, a rotational unit for alternating axial displacement directions of the bowl body and cylindrical piston in a coaxial manner, to which the supply input is disposed in a rotatable and sealed manner.

5. The hydraulic adjusting device according to claim 4, wherein the supply input is accommodated in a central axial bore hole of the dome of the bowl body in a rotatable manner.

6. The hydraulic adjusting device according to claim 4, wherein the bowl body is a component of a cover for a hub.

7. The hydraulic adjusting device according to claim 6, wherein the hub is axially and non-rotatably connected to a rotary drive and is a component of a fan wheel, which is provided with fan blades supported in the hub at its circumference, that can be adjusted radially and via the adjusting device, as an actuator, in terms of an angle of incidence.

8. The hydraulic adjusting device according to claim 4, wherein the adjusting device is supported against a supporting structure via its bowl body such that it can rotate and is axially stationary, and the cylindrical piston that can be axially adjusted in relation to the bowl body forms the actuator for a working unit that is to be acted on axially.

9. The hydraulic adjusting device according to claim 2, wherein the bowl body and the cylindrical piston form, together with the working chamber accommodated therein, a rotational unit for alternating axial displacement directions of the bowl body and cylindrical piston in a coaxial manner, to which the supply input is disposed in a rotatable and sealed manner.

10. The hydraulic adjusting device according to claim 3, wherein the bowl body and the cylindrical piston form, together with the working chamber accommodated therein, a rotational unit for alternating axial displacement directions of the bowl body and cylindrical piston in a coaxial manner, to which the supply input is disposed in a rotatable and sealed manner.

11. The hydraulic adjusting device according to claim 5, wherein the bowl body is a component of a cover for a hub.

12. The hydraulic adjusting device according to claim 5, wherein the adjusting device is supported against a supporting structure via its bowl body such that it can rotate and is axially stationary, and the cylindrical piston that can be axially adjusted in relation to the bowl body forms the actuator for a working unit that is to be acted on axially.

* * * * *